United States Patent [19]

Nonaka et al.

[11] Patent Number: 5,687,150
[45] Date of Patent: Nov. 11, 1997

[54] APPARATUS FOR AND METHOD OF RECORDING INFORMATION, AND APPARATUS FOR RECORDING AND REPRODUCING INFORMATION

[75] Inventors: Yoshiya Nonaka; Katsuaki Yamanoi; Sei Kato, all of Kawagoe, Japan

[73] Assignee: Pioneer Electronic Corporation, Japan

[21] Appl. No.: 546,672

[22] Filed: Oct. 23, 1995

[30] Foreign Application Priority Data

Oct. 24, 1994 [JP] Japan ................................. 6-258546

[51] Int. Cl.⁶ ....................................... G11B 7/00
[52] U.S. Cl. ............................ 369/60; 369/59; 369/47
[58] Field of Search ........................ 369/60, 59, 58, 369/54, 53, 50, 47, 48, 49, 124, 32

[56] References Cited

U.S. PATENT DOCUMENTS 5,406,533  4/1995  Maeda .......................... 369/54 X
5,528,569  6/1996  Fujiie et al. ........................ 369/48

Primary Examiner—Muhammad N. Edun
Attorney, Agent, or Firm—Nixon & Vanderhye

[57] ABSTRACT

A recording apparatus records information, which is continuously inputted from the external, onto a record medium. The recording apparatus is provided with: a compressing device for compressing the record information; a first memory for temporarily storing the compressed record information; an optical pickup for writing and reading the compressed record information onto and from the record medium; a control device for controlling the optical pickup to periodically write the compressed record information from the first memory by a predetermined data volume onto the record medium, to stop writing in a record stop duration, and to read the compressed record information from the record medium as compressed reproduction information in the record stop duration; a second memory for storing the compressed reproduction information; and a judgement device for judging whether or not the compressed reproduction information stored in the second memory is coincident with the compressed record information stored in the first memory.

22 Claims, 9 Drawing Sheets

MEMORY FOR RECORDING

MEMORY FOR REPRODUCING

APPARATUS FOR AND METHOD OF RECORDING INFORMATION, AND APPARATUS FOR RECORDING AND REPRODUCING INFORMATION

BACKGROUND OF THE INVENTION

1. Field of the Invention

The present invention generally relates to an apparatus for and a method of recording information onto a record medium and an apparatus for recording and reproducing information onto and from the record medium, and more particularly to an apparatus for and a method of compressing digital information, recording it onto the record medium such as a so-called mini-disc (hereinbelow, it is called as an "MD") and reproducing it from the record medium in such a manner that a random-accessing operation with respect to the recorded compressed digital information is possible.

2. Description of the Related Art

The MD is well known nowadays as one of record media of magneto optical disc type, which can be recorded with the audio information in the digital form. The MD player for recording and reproducing the magneto optical disc (i.e. the MD) is provided with just one optical pickup to perform recording and reproducing the magneto optical disc.

However, the MD player provided with just one optical pickup cannot perform the reproducing operation along with the recording operation while the successively inputted information is being continuously recorded onto the magneto optical disc. Thus, it is not possible to check during the recording process whether or not the recording operation with respect to the magneto optical disc is failed.

Accordingly, it may be proposed to equip two optical pickups i.e. one optical pickup exclusive for the recording operation and one optical pickup exclusive for the reproducing operation, to the MD player, so as to make it possible to check the recording condition of the magneto optical disc during the recording operation by simultaneously operating two optical pickups. However, in this case, since there must be two optical pickups in one MD player, the construction of the MD player becomes complicated and the number of the constitutional elements would be increased quite a bit, resulting in that the production cost of the MD player is increased and that the reliability of the MD player is degraded.

SUMMARY OF THE INVENTION

It is therefore an object of the present invention to provide an apparatus for and a method of recording information onto a record medium, and an apparatus for recording and reproducing information onto and from the record medium, which can check and confirm the recording condition during the recording operation by use of only one optical pickup.

The above object of the present invention can be achieved by a first apparatus for recording record information, which is continuously inputted from the external, onto a record medium. The first recording apparatus is provided with: a compressing device for compressing the record information; a first memory for temporarily storing the compressed record information; an optical pickup for writing and reading the compressed record information onto and from the record medium; a control device for controlling the optical pickup to periodically write the compressed record information from the first memory by a predetermined data volume onto the record medium, to stop writing in a record stop duration, and to read the compressed record information from the record medium as compressed reproduction information in the record stop duration; a second memory for storing the compressed reproduction information; and a judgement device for judging whether or not the compressed reproduction information stored in the second memory is coincident with the compressed record information stored in the first memory.

In the recording operation of the first recording apparatus of the present invention, the record information is continuously inputted from the external. Then, the record information is compressed to be the compressed record information by the compressing device, and is temporarily stored in the first memory. Here, the compression may be performed by use of the minimum audible property and the masking effect of the ears of human being. This compression method achieves the compression rate of about ⅕, for example. Then, under the control of the control device, the optical pickup periodically writes the compressed record information from the first memory by a predetermined data volume onto the record medium. The optical pickup stops writing in a record stop duration. At this time, the optical pickup reads the compressed record information from the record medium as compressed reproduction information in the record stop duration, and the compressed reproduction information is stored into the second memory. Then, it is judged by the judgement device whether or not the compressed reproduction information stored in the second memory is coincident with the compressed record information stored in the first memory. Thus, the recording condition of the record medium can be checked and confirmed by the judgement result of the judgement device. Namely, if the compressed reproduction information is judged to be coincident with the compressed record information, it can be confirmed that the recording condition is good. If the compressed reproduction information is not judged to be coincident with the compressed record information, it can be confirmed that the recording condition is not good and some failure in recording operation is suspected. In this manner, by making the best use of the record stop duration of the optical pickup, the recording condition can be checked and confirmed during the recording operation by use of just one optical pickup.

The above object of the present invention can be achieved by a first recording and reproducing apparatus for recording record information, which is continuously inputted from the external, onto a record medium, and reproducing the record information from the record medium. The first recording and reproducing apparatus is provided with: a compressing device for compressing the record information; a first memory for temporarily storing the compressed record information; an optical pickup for writing and reading the compressed record information onto and from the record medium; a control device for controlling the optical pickup to periodically write the compressed record information from the first memory by a predetermined data volume onto the record medium, to stop writing in a record stop duration, and to read the compressed record information from the record medium as compressed reproduction information in the record stop duration, in a recording operation, and for controlling the optical pickup to read the compressed record information from the record medium as the compressed reproduction information in a reproducing operation; a second memory for storing the compressed reproduction information read from the record medium in the record stop duration in the recording operation; a judgement device for judging whether or not the compressed reproduction information stored in the second memory is coincident with the compressed record information stored in the first memory in the recording operation; and an expansion device for expanding the compressed reproduction information to be identical with the record information before compressed by the compressing device in the reproducing operation.

The recording operation of the first recording and reproducing apparatus of the present invention, is performed in the same manner as the above described recording operation of the recording apparatus of the present invention. In the reproducing operation of the recording and reproducing apparatus of the present invention, under the control of the control device, the optical pickup reads the compressed record information from the record medium as the compressed reproduction information, and the compressed reproduction information is expanded by the expansion device to be identical with the record information before compressed by the compressing device. Thus, since the recording condition of the compressed record information on the record medium can be checked and confirmed during the recording operation, the reproduction operation can be reliably and certainly performed on the basis of the compressed reproduction information which recording condition has been confirmed to be good.

In one aspect of the first recording apparatus of the present invention, the recording apparatus is further provided with: an expansion device for expanding the compressed reproduction information to be identical with the record information before compressed by the compressing device. Thus, it is possible for the user to check and confirm the recording condition by listening to the record information during the recording operation.

In one aspect of the first recording and reproducing apparatus of the present invention, the expansion device expands the compressed reproduction information in the recording operation. Thus, it is possible for the user to check and confirm the recording condition by listening to the record information during the recording operation.

In another aspect of the first recording apparatus and the first recording and reproducing apparatus of the present invention, each of the apparatuses is further provided with: an erasing device for erasing the compressed reproduction information in the second memory and the compressed record information in the first memory if the compressed reproduction information in the second memory is judged to be coincident with the compressed record information in the first memory. Thus, the memory capacity required for each of the first memory and the second memory can be made little by making the best use of the memory area of the memories by erasing the information which is not necessary to store any more.

In another aspect of the first recording apparatus and the first recording and reproducing apparatus of the present invention, the control device controls the optical pickup to write the compressed record information, with which the compressed reproduction information is not judged to be coincident, onto the record medium at a same address again. Thus, the failure in the recording operation which has been checked by use of the judgement device, can be cured by performing the recording operation again with respect to the same address if possible.

In another aspect of the first recording apparatus and the first recording and reproducing apparatus of the present invention, the control device controls the optical pickup to write the compressed record information, with which the compressed reproduction information is not judged to be coincident, onto the record medium at a different address again. Thus, the failure in the recording operation which has been checked by use of the judgement device, can be cured by performing the recording operation again with respect to the different address if possible. This is especially effective, after it has been failed to record the compressed record information with respect to the same address twice.

In another aspect of the first recording apparatus and the first recording and reproducing apparatus of the present invention, the first memory and the second memory comprise a dual port RAM (Random Access Memory) connected with the control device through a communication bus. Thus, the first memory and the second memory can be directly controlled by the controller, so that the controlling operation by the control device and the judging operation by the judgement device can be performed speedily.

In another aspect of the first recording apparatus and the first recording and reproducing apparatus of the present invention, the record information is inputted from the external through either one of a digital terminal for digital record information and an analog terminal for analog record information; and the apparatus is further provided with an A/D (Analog to Digital) convertor for converting the analog record information inputted through the analog terminal to the digital record information and outputting the digital record information to the compressing device. Thus, desirable one of the analog information and the digital information can be inputted and recorded by the apparatus of the present invention without any problem.

In another aspect of the first recording apparatus and the first recording and reproducing apparatus of the present invention, each of the apparatuses is further provided with another judgement device for judging whether or not the first memory is over-flown before the compressed record information of the predetermined data volume is stored in the first memory. The control device controls the optical pickup to stop recording if the first memory is judged to be over-flown. Thus, the failure or error in the recording operation can be speedily checked on the basis of the over-flowing condition of the first memory.

The above object of the present invention can be also achieved by a second apparatus for recording record information, which is continuously inputted from the external, onto a record medium. The second recording apparatus is provided with: a compressing device for compressing the record information; a first memory for temporarily storing the compressed record information; an optical pickup for writing and reading the compressed record information onto and from the record medium; a control device for controlling the optical pickup to periodically write the compressed record information from the first memory by a predetermined data volume onto the record medium, to stop writing in a record stop duration, and to read the compressed record information from the record medium as compressed reproduction information in the record stop duration; a second memory for storing the compressed reproduction information; and an expansion device for expanding the compressed reproduction information from the second memory to be identical with the record information before compressed by the compressing device.

In the recording operation of the second recording apparatus of the present invention, along with the writing operation of the optical pickup onto the record medium, the compressed reproduction information is read by use of the record stop duration in the recording operation. Then, the compressed reproduction information stored in the second memory is expanded by the expansion device. Thus, it is possible for the user to check and confirm the recording condition by listening to the record information, which can be generated by use of the expanded reproduction information, during the recording operation.

The above object of the present invention can be also achieved by a second apparatus for recording record information, which is continuously inputted from the external, onto a record medium, and reproducing the record information from the record medium. The second recording and reproducing apparatus is provided with: a compressing device for compressing the record information; a first memory for temporarily storing the compressed record information; an optical pickup for writing and reading the compressed record information onto and from the record medium; a control device for controlling the optical pickup to periodically write the compressed record information from the first memory by a predetermined data volume onto the record medium, to stop writing in a record stop duration, and to read the compressed record information from the record medium as compressed reproduction information in the record stop duration, in a recording operation, and for controlling the optical pickup to read the compressed record information from the record medium as the compressed reproduction information in a reproducing operation; a second memory for storing the compressed reproduction information read from the record medium in the record stop duration in the recording operation; and an expansion device for expanding the compressed reproduction information from the second memory to be identical with the record information before compressed by the compressing device in the recording operation, and for expanding the compressed reproduction information to be identical with the record information before compressed by the compressing device in the reproducing operation.

The recording operation of the second recording and reproducing apparatus of the present invention, is performed in the same manner as the above described recording operation of the second recording apparatus of the present invention. In the reproducing operation of the second recording and reproducing apparatus of the present invention, under the control of the control device, the optical pickup reads the compressed record information from the record medium as the compressed reproduction information, and the compressed reproduction information is expanded by the expansion device to be identical with the record information before compressed by the compressing device. Thus, since the recording condition of the compressed record information on the record medium can be checked and confirmed during the recording operation, the reproduction operation can be reliably and certainly performed on the basis of the compressed reproduction information which recording condition has been confirmed to be good.

In one aspect of the second recording apparatus and the second recording and reproducing apparatus of the present invention, each of the apparatuses is further provided with: a switching device for switching a first information route, which is from the first memory to the optical pickup, and a second information route, which is from the optical pickup to the second memory, from one to another. Thus, the data transmission from the first memory to the optical pickup and the data transmission from the optical pickup to the second memory can be performed quite efficiently by the switching device.

The above object of the present invention can be also achieved by a first method of recording record information onto a record medium by use of an optical pickup. The first recording method is provided with the steps of: continuously inputting the record information; compressing the inputted record information; temporarily storing the compressed record information into a first memory; controlling the optical pickup to periodically write the compressed record information from the first memory by a predetermined data volume onto the record medium, to stop writing in a record stop duration, and to read the compressed record information from the record medium as compressed reproduction information in the record stop duration; storing the compressed reproduction information into a second memory; and judging whether or not the compressed reproduction information stored in the second memory is coincident with the compressed reproduction information stored in the first memory.

According to the first recording method of the present invention, the recording operation same as the aforementioned first recording apparatus of the present invention can be performed.

The above object of the present invention can be also achieved by a second method of recording record information onto a record medium by use of an optical pickup. The second recording method is provided with the steps of: continuously inputting the record information; compressing the inputted record information; temporarily storing the compressed record information into a first memory; controlling the optical pickup to periodically write the compressed record information from the first memory by a predetermined data volume onto the record medium, to stop writing in a record stop duration, and to read the compressed record information from the record medium as compressed reproduction information in the record stop duration; storing the compressed reproduction information into a second memory; and expanding the compressed reproduction information from the second memory to be identical with the record information before compressed by the compressing step.

According to the second recording method of the present invention, the recording operation same as the aforementioned second recording apparatus of the present invention can be performed.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

First Embodiment

The first embodiment of the present invention will be explained with referring to FIGS. 1 to 4.

The present embodiment is constructed as an MD apparatus which has only one optical pickup, and which magneto-optically records information and simultaneously confirms the recording condition of the recorded information.

Figure 1:
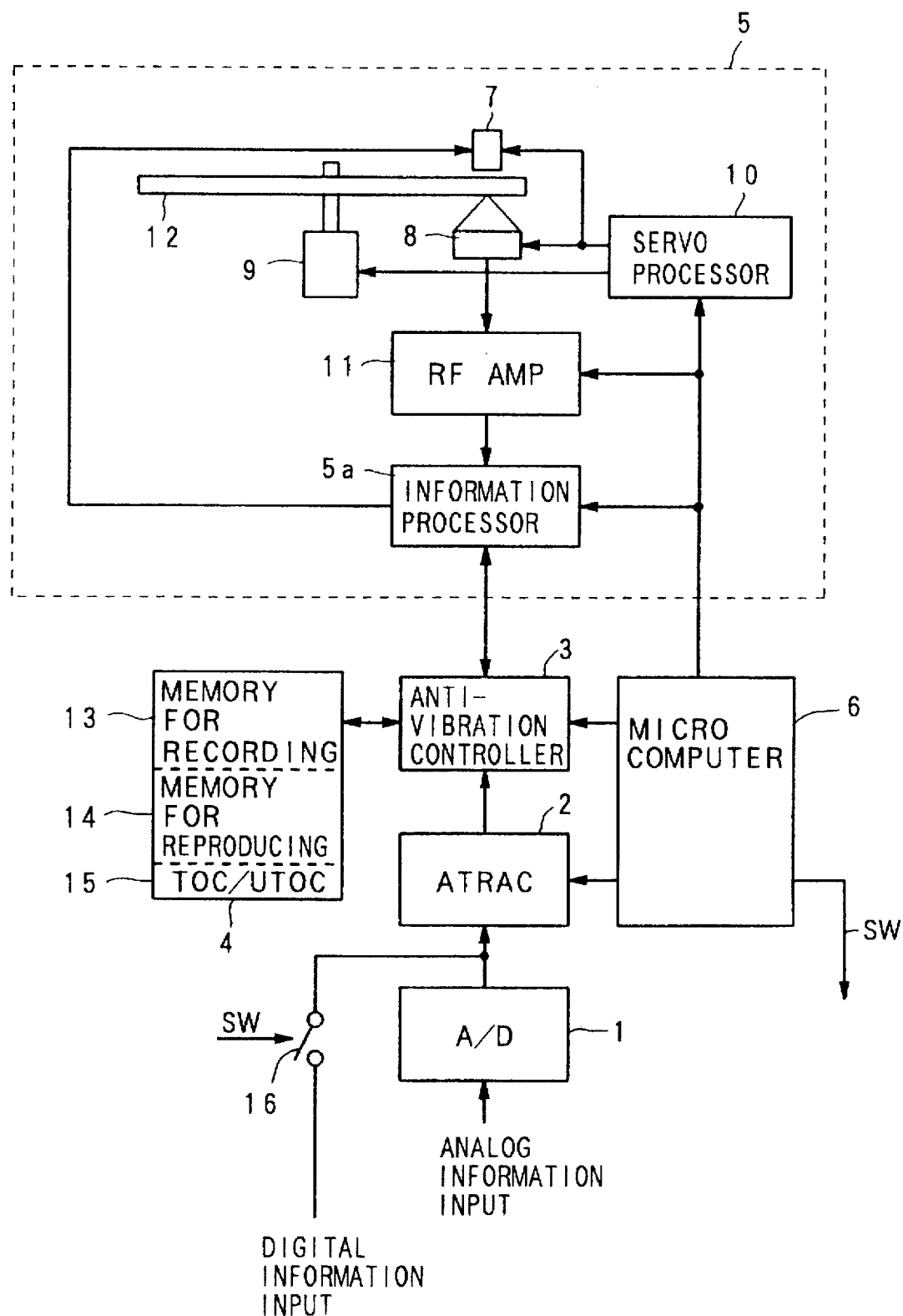
FIG. 1 is a block diagram of an MD apparatus as a first embodiment of the present invention.

FIG. 1 shows a construction of an MD apparatus as the first embodiment.

In FIG. 1, the MD apparatus is provided with an A/D (Analog to Digital) convertor 1, an ATRAC (Adaptive TRansform Acoustic Coding) device 2, an anti-vibration controller 3, a memory for storing compressed information 4, a record and reproduction process unit 5, a micro computer 6 and an analog/digital information input switch 16.

The A/D convertor 1 is constructed to convert the analog record information inputted through an analog terminal from the external of the MD apparatus to digital record information and outputs it to the ATRAC device 2 at the time of recording the information onto an magneto optical disc 12. The analog/digital information input switch 16 is adapted to perform the switching operation on the basis of an analog/digital information input switch signal SW outputted from the micro computer 6 to determine which is to be inputted the digital information or the analog information at the time of recording.

The digital record information is inputted through a digital terminal from the external of the MD apparatus or the A/D convertor 1 to the ATRAC device 2 at the time of recording. The ATRAC device 2 compresses the data volume of the inputted digital record information by the factor of about ⅕, by use of the minimum audible property and the masking effect of the ears of human being, and outputs the compressed record information to the anti-vibration controller 3.

The memory for storing compressed information 4 has a memory capacity of about 1 Mega Bits and includes a memory for recording 13, a memory for reproducing 14 and a memory for TOC (Table Of Content data)/UTOC (User TOC data) 15. The memory for recording 13 is a memory for temporarily storing the compressed record information which is inputted from the ATRAC device 2 through the anti-vibration controller 3. The memory for reproducing 14 is a memory for temporarily storing the compressed reproduction information which is inputted from the record and reproduction process unit 5 through the anti-vibration controller 3. The anti-vibration controller 3 is adapted to prevent the sound jumping etc. in the compressed reproduction information due to the vibration. Each of the memories 13 and 14 needs a memory area of at least 1 cluster. The memory for TOC/UTOC 15 is a memory for storing a table to manage the information of the magneto optical disc 12.

The anti-vibration controller 3 is constructed to control the data inputting and outputting operation with respect to the memory for storing compressed information 4. The compressed record information is inputted from the ATRAC device 2 to the anti-vibration controller 3 at the time of recording. The anti-vibration controller 3 outputs the compressed record information such that the compressed record information is stored into the memory for recording 13, and, when the stored data volume exceeds the data volume of the record unit, the anti-vibration controller 3 reads the compressed record information from the memory for recording 13 in the order of storing it into the memory for recording 13 and outputs it to the record and reproduction process unit 5. Here, the "record unit" indicates a unit of information corresponding to 1 cluster (1 cluster is equal to 36 sectors, and 1 sector is equal to 2352 bytes) which has been compressed by the ATRAC device 2. The recording operation by the record and reproduction process unit 5 is periodically performed for each recording unit.

The record and reproduction process unit 5 is provided with an information processor 5a, a magnetic head 7, an optical pickup 8, a spindle motor 9 and a servo processor 10, and an RF (Radio Frequency) amplifier 11 for writing and reading data on the magneto optical disc 12. The record and reproduction process unit 5 is constructed such that, after the compressed record information is inputted from the memory for storing compressed information 4 at the time of recording, the inputted information is modulated by the information processor 5a and is recorded onto the magneto optical disc 12 by the magnetic head 7 and the optical pickup 8 under the control of the servo processor 10. The record and reproduction process unit 5 is further constructed such that the compressed record information, which has been recorded on the magneto optical disc 12, is read by the optical pickup 8 at the time of reproduction, the read information is amplified by the RF amplifier 11 and is demodulated by the information processor 5a, and the demodulated information is outputted to the memory for storing compressed information 4 as the compressed reproduction information.

The magneto optical disc 12 is constructed as a magneto optical disc of re-writable type by use of the magnetic film.

Here, the recording process of the compressed record information in the MD apparatus of the first embodiment will be explained with referring to a flow chart of FIG. 2.

It is assumed that the following processes are performed along with the recording process of the magneto optical disc 12 at the initial condition. Namely, the analog/digital information input switch 16 selects the analog information input on the basis of the analog/digital information input signal SW of the micro computer 6. The analog record information is continuously inputted to the A/D convertor 1 from the external of the MD apparatus. The digital record information, which is inputted through the A/D convertor 1, is compressed by the unit of 1 cluster by the ATRAC device 2. The compressed record information is outputted to the anti-vibration controller 3 from the ATRAC device 2. The anti-vibration controller 3 stores the compressed record information to the memory for storing compressed information 4 one after another.

Figure 2:
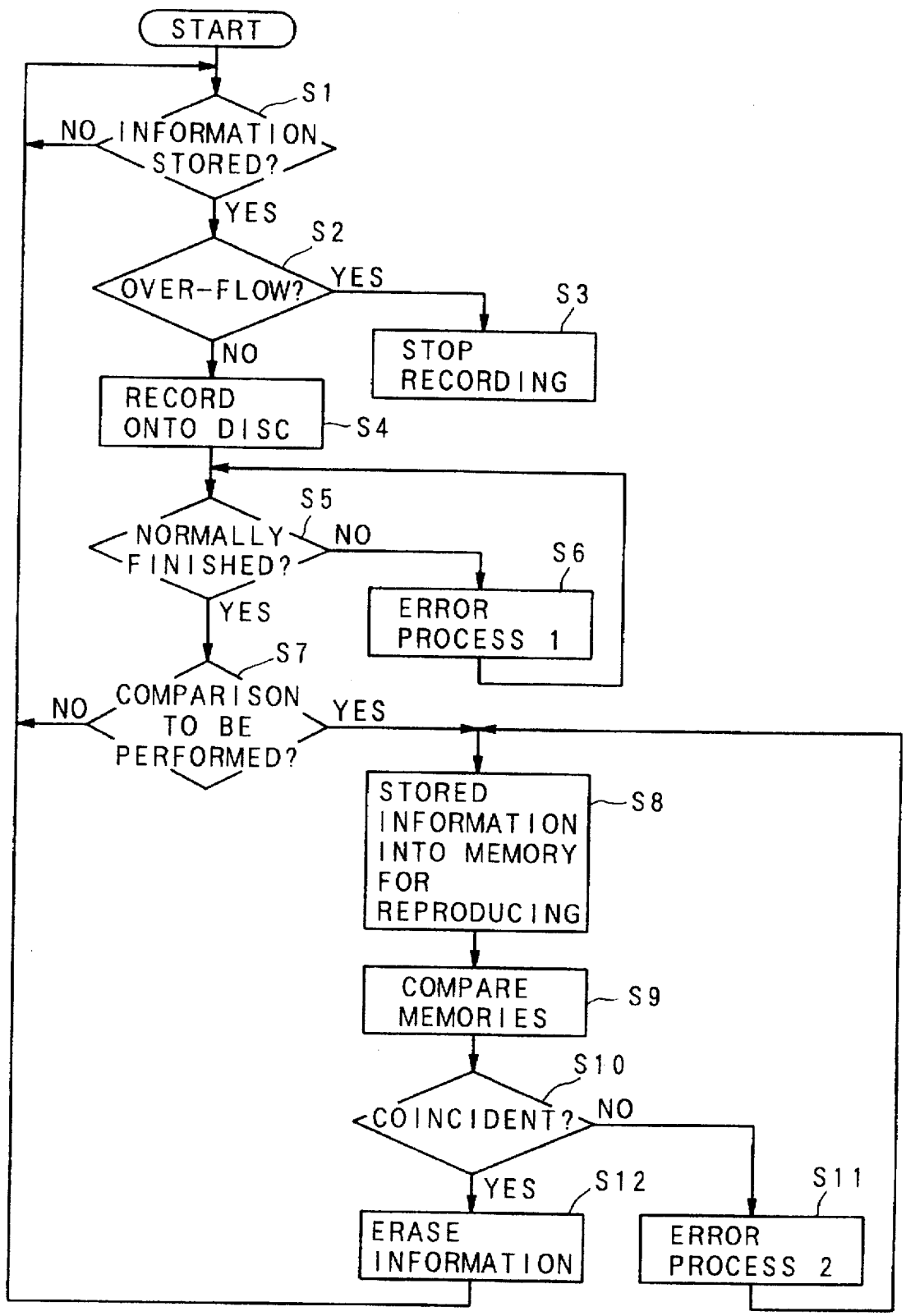
FIG. 2 is a flow chart showing a recording operation of the first embodiment.

In FIG. 2, the micro computer 6 judges whether or not the compressed record information is stored in the memory for recording 13 by the data volume of not less than the record unit (step S1).

If it is not judged to be stored (step S1: NO), the flow returns to the step S1. Namely, this judgement is continued until it is judged to be stored.

If it is judged to be stored (step S1: YES), the micro computer 6 judges whether or not the memory for recording 13 is over-flown with the stored information (step S2).

If it is judged to be over-flown (step S2: YES), the MD apparatus stops the information recording process since there happens an error in the memory for recording 13 (step S3).

If it is not judged to be over-flown (step S2: NO), the micro computer 6 controls the record and reproduction process unit 5 to record the compressed record information stored in the memory for recording 13 by the data volume of the record unit, onto the magneto optical disc 12 in the order of storing it to the memory for recording 13 (step S4). Then, the micro computer 6 judges whether or not recording onto the magneto optical disc 12 is normally finished or not (step S5). Here, the "normally finished" means that there has been no abnormality found in the magnetic head 7, the optical pickup 8 or the servo system for the spindle motor 9 such as a focusing error, tracking error etc., and the recording operation has been successfully completed at the target address.

If it is not judged to be normally finished (step S5: NO), the cause of the abnormality is examined and it is recovered to be the normal condition so that the compressed record information of the memory for recording 13 can be recorded on the magneto optical disc 12, as a predetermined error process (step S6). More concretely, if the abnormality lies in the servo system, the re-adjustment of focusing elements or the re-adjustment of tracking elements etc. is performed. If writing to a target address has been failed twice, this address is registered as a defective sector, so that another address is specified as a new target address for recording, and the compressed record information is recorded on the magneto optical disc 12 by use of the new target address. After that, the flow returns to the step S5 so as to judge whether or not recording onto the magneto optical disc 12 is normally finished this time.

If it is judged to be normally finished (step S5: YES), the micro computer 6 judges whether or not the comparison process for the compressed record information recorded on the magneto optical disc 12 is to be performed with considering the condition of the MD apparatus such as the empty memory area of the memory for recording 13 (step S7).

If it is not judged to be performed (step S7: NO), the flow returns to the step S1.

If it is judged to be performed (step S7: YES), the compressed record information, which recording condition has not been checked and confirmed yet, out of the compressed record information recorded on the magneto optical disc 12 is reproduced and stored into the memory for reproducing 14 (step S8). The compressed reproduction information stored in the memory for reproducing 14 and the compressed record information stored in the memory for recording 13 are compared with each other one byte by one byte (step S9), and it is judged whether or not the compared compressed reproduction information is coincident with the compared compressed record information (step S10).

As a result of the comparison, if they are not coincident with each other (step S10: NO), the compressed record information of the memory for recording 13, at the address where the difference of the compared information is found out, is recorded again onto the magneto optical disc 12. Namely, the optical pickup 8 is immediately returned to the position corresponding to this difference, and the reading operation is performed again thereat. If the failure or error indicated by this difference is due to the vibration of the magneto optical disc 12, this repeated operation may cure the failure or error. In this case, if the difference in the compared information is found out again i.e. twice at the same address, this address on the magneto optical disc 12 is registered as the defective sector, and the recording operation is resumed by use of a new target address, as an error process (step S11). Then, the flow returns to the step S8.

As a result of the comparison, if they are coincident with each other (step S10: YES), the compressed record information in the memory for recording 13 and the compressed reproduction information stored in the memory for reproducing 14, which comparisons have been completed, are erased from the memory for recording 13 and the memory for reproducing 14 respectively (step S12). Then, the flow returns to the step S1.

Figure 3A:
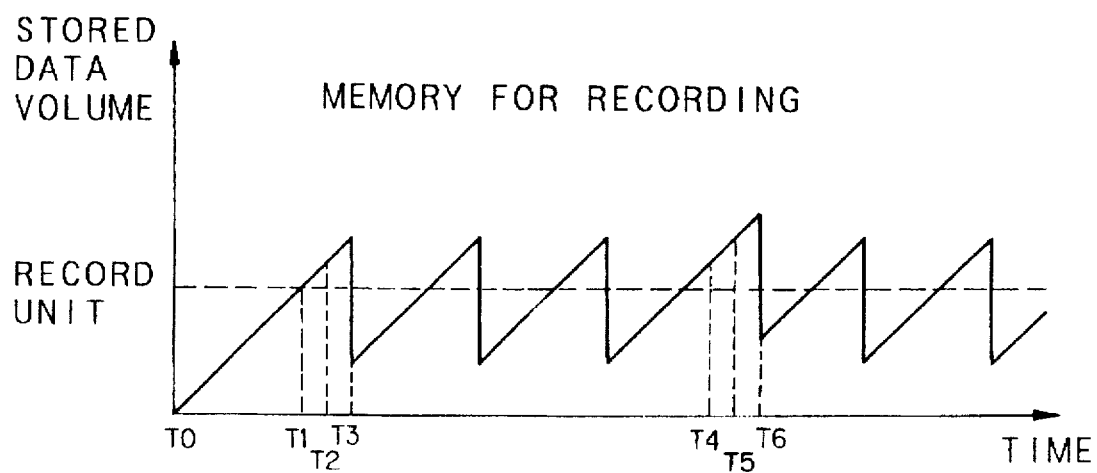
FIG. 3, which consist of FIG. 3A and FIG. 3B, are timing charts of stored data volumes of the memories in the first embodiment.
Figure 3B:
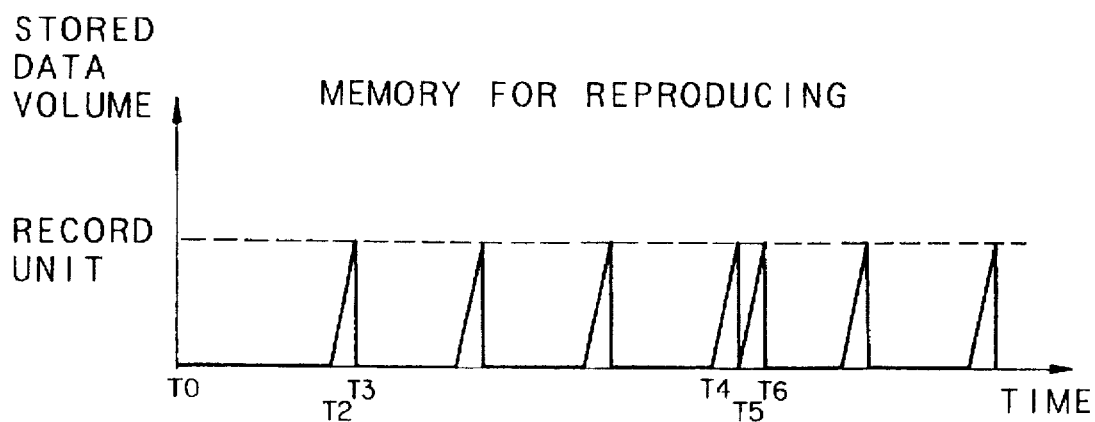

Nextly, the relationship between the stored data volume of the memory 4 for storing compressed information 4 and the elapsed time in the MD apparatus will be explained with referring to timing charts of FIG. 3, in which FIG. 3A shows the case of the stored data volume of the compressed record information stored in the memory for recording 13 and FIG. 3B shows the case of the stored data volume of the compressed reproduction information stored in the memory for reproducing 14. In FIG. 3, the x axis represents the elapsed time and the y axis represents the stored data volume in each memory. At the y axis, the boundary line corresponding to the stored data volume of the record unit, which is the unit for recording the magneto optical disc 12 with the compressed record information of the memory for recording 13. It is enough as the memory capacity of each of the memory for recording 13 and the memory for reproducing 14 to be not less than the data volume of the record unit.

Firstly, in the initial condition at the time "T0", the information is not stored in the memory for recording 13 or the memory for reproducing 14.

After the time "T0", the compressed record information is continuously being stored into the memory for recording 13 at a constant rate. When the data volume of the compressed record information stored in the memory for recording 13 reaches the data volume of the record unit, the MD apparatus starts recording onto the magneto optical disc 12 as for the compressed record information in the data volume of the record unit at the time "T1".

If recording onto the magneto optical disc 12 is normally finished and if it is during the record stop duration at the record and reproduction process unit 5 i.e. while the record and reproduction process unit 5 stops the recording operation, the micro computer 6 starts storing the compressed record information on the magneto optical disc 12, which recording condition is not checked and confirmed yet, by successively reproducing it by the data volume of the record unit in the order of storing it into the memory for reproducing 14 as the compressed reproduction information, by use of this record stop duration, at the time "T2".

At the time "T3", the micro computer 6 compares the compressed reproduction information stored in the memory for reproducing 14 with the compressed record information stored in the memory for recording 13. If the micro computer 6 confirms they are coincident with each other as a result of the comparison, the micro computer 6 erases the compressed record information in the memory for recording 13 and the compressed reproduction information in the memory for reproducing 14 which comparison has been successfully completed.

After that, in the same manner, the MD apparatus repeats recording the input information as it confirms whether or not the recording condition of the compressed record information recorded on the magneto optical disc 12 is normal.

Nextly, the comparison error process will be explained as for the case where the compressed record information in the memory for recording 13 and the compressed reproduction information in the memory for reproducing 14 are different from each other at a certain address as a result of the comparison.

At the time "T4", by use of the record stop duration of the record and reproduction process unit 5, the micro computer 6 reproduces the compressed record information by the data volume of the record unit, which recording condition has not been checked and confirmed yet, out of the compressed record information recorded on the magneto optical disc 12. The micro computer 6 starts storing the reproduced compressed information as the compressed reproduction information into the memory for reproducing 14.

The micro computer 6 compares the compressed reproduction information stored in the memory for reproducing 14 with the compressed record information stored in the memory for recording 13. As a result of the comparison, if there exists any difference in the compared information, at the time "T5", the micro computer 6 erases the compressed reproduction information stored in the memory for reproducing 14, reproduces again the compressed record information stored on the magneto optical disc 12, and starts storing it as the compressed reproduction information into the memory for reproducing 14.

When the compressed reproduction information in the data volume of the record unit is stored in the memory for reproducing 14, the micro computer 6 compares again the compressed reproduction information stored in the memory for reproducing 14 with the compressed record information stored in the memory for recording 13. As a result of the comparison, if the micro computer 6 confirms that they are the same information to each other, the micro computer 6 erases the compressed record information in the memory for recording 13 and the compressed reproduction information in the memory for reproducing 14, which comparison has been successfully completed at the time "T6".

In this way, the comparison error process as described above is performed when the comparison error happens between the content of the memory for reproducing 14 and the content of the memory for recording 13. Then, when the comparison error is recovered, the MD apparatus repeats again the recording the input information while it checks and confirms whether or not the recording condition of the compressed record information recorded on the magneto optical disc 12 is normal.

Figure 4A:
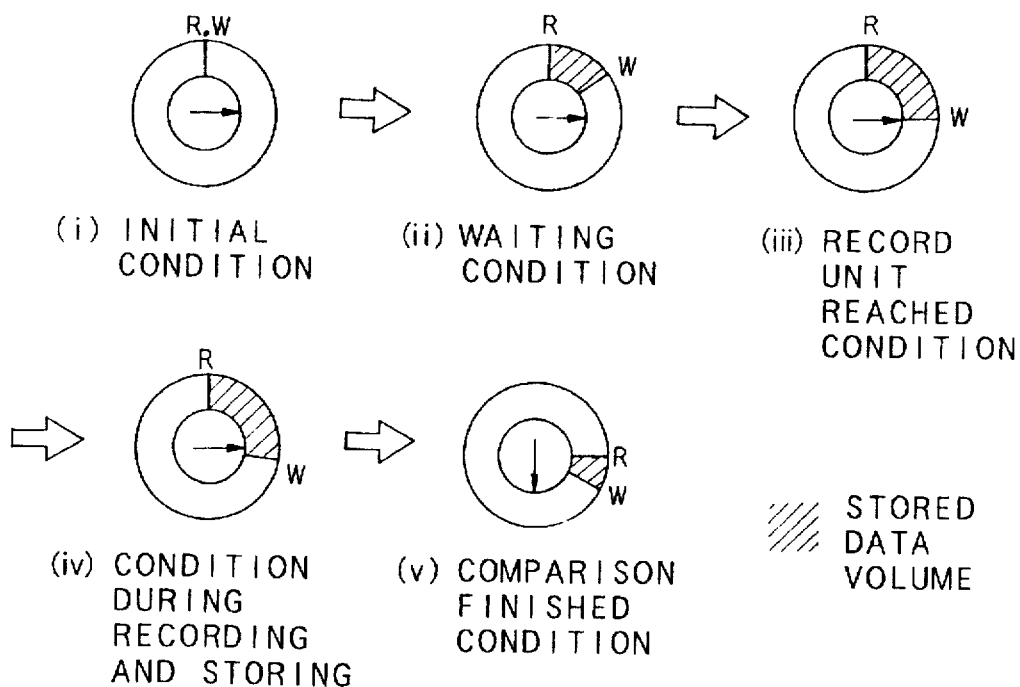
FIG. 4, which consist of FIG. 4A and 4B, are diagrams showing used memory areas of the memories in the first embodiment.
Figure 4B:
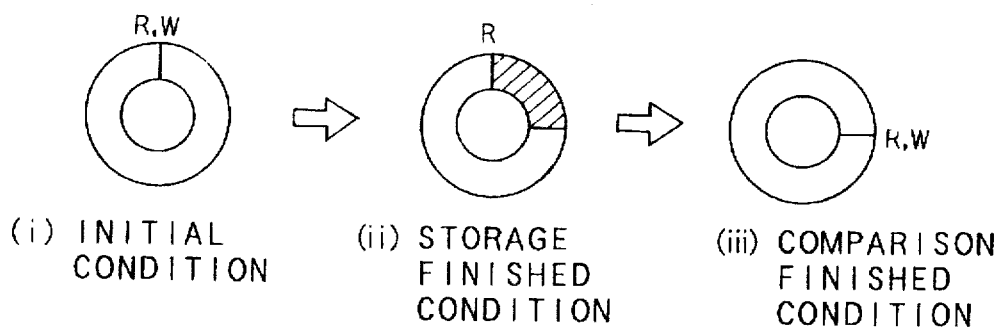

Nextly, the used memory area in the memory for storing compressed information 4 at the time of recording in the first embodiment, will be explained with referring to FIG. 4. Here, FIG. 4A shows the used memory area of the memory for recording 13, while FIG. 4B shows the used memory area of the memory for reproducing 14. In FIG. 4, a reference mark "→" represents a record unit pointer, "R" represents a reading pointer, "W" represents a writing pointer, and a shaded area in a ring indicates the data volume of the information stored in the memory. Here, it is assumed that the compressed record information inputted from the ATRAC device 2 is stored in the right hand direction in each ring of FIG. 4, and that the information is continuously inputted at a constant rate into the memory for storing compressed information 4.

In FIG. 4A, at the initial condition, since the compressed record information is not inputted in the memory for recording 13, the shaded area indicating the stored data volume does not exists in the figure and the reading pointer R and the writing pointer W are located at the same position (condition (i) in FIG. 4A).

On the other hand, in FIG. 4B, at the initial condition, since the compressed reproduction information is not inputted in the memory for reproducing 14, the shaded area indicating the stored data volume does not exists in the figure, and the reading pointer R and the writing pointer W are located at the same position in the same manner as the memory for recording 13 (condition (i) in FIG. 4B).

Then, in the waiting condition until the data volume of the compressed record information stored in the memory for recording 13 reaches the data volume of the record unit, the new compressed record information is continuously stored into the memory for recording 13 at the position indicated by the writing pointer W. The shaded area between the reading pointer R and the writing pointer W, which indicates the data volume of the compressed record information stored in the memory for recording 13, increases. At this stage, the writing pointer W does not reach the position corresponding to the record unit pointer "→" yet.

Then, at the moment when the data volume of the compressed record information stored in the memory for recording 13 reaches the data volume of the record unit, the writing pointer W and the record unit pointer "→" are located at the same position (the condition (iii) in FIG. 4A).

Then, while the compressed record information recorded on the magneto optical disc 12 is stored into the memory for reproducing 14 after the compressed record information stored in the memory for recording 13 is recorded onto the magneto optical disc 12, the compressed record information is still continuously stored into the memory for recording 13 through the anti-vibration controller 3 from the ATRAC device 2 (condition (iv) in FIG. 4A).

Then, when it is finished to store the compressed record information recorded on the magneto optical disc 12 into the memory for reproducing 14, the stored data volume of the compressed reproduction information stored in the memory for reproducing 14 is just the same as the data volume of the record unit (condition (ii) in FIG. 4B).

When the compressed record information which comparison has been finished is erased since the compressed reproduction information in the memory for reproducing 14 and the compressed record information in the memory for recording 13 are coincident with each other as a result of the comparison, if the comparison is normally finished, the position of the record unit pointer "→" is moved (rotated) in the right hand direction by the amount corresponding to the data volume of the record unit, and the position of the reading pointer R is moved (rotated) to the position of the previous record unit pointer "→" so that the new compressed record information can be recorded with respect to the area of the compressed record information which comparison has been successfully finished (condition (v) in FIG. 4A). After that, the waiting condition shown in the condition (ii) in FIG. 4A is continued until the position of the writing pointer W reaches the position of the record unit pointer "→".

On the other hand, when the compressed reproduction information is erased since the comparison of the compressed information has been normally finished, the position of the reading pointer R and the position of the writing pointer W are located at the same position in the memory for reproducing 14 (condition (iii) in FIG. 4B).

As described above in detail, according to the construction of the present embodiment, the micro computer 6 reproduces and stores the compressed record information recorded on the magneto optical disc 12, into the memory for reproducing 14, and the compressed reproduction information stored in the memory for storing compressed information 4 and the compressed record information stored in the memory for recording 13 are compared with each other during the record stop duration of the optical pickup 8. As a result, the MD apparatus which has just one optical pickup 8, can perform the comparison by comparing the compressed record information recorded onto the magneto optical disc 12 and the compressed reproduction information reproduced from the magneto optical disc 12.

After the comparison is finished, the compressed record information of the memory for recording 13 and the compressed reproduction information of the memory for reproducing 14 are erased. Thus, the input information can be efficiently stored into the memory for recording 13 and the memory for reproducing 14 even if the memory capacities are rather little, so that the memory for recording 13 and the memory for reproducing 14 can be constructed by use of a relatively cheep memory device with a relatively little capacity.

Second Embodiment

Figure 5:
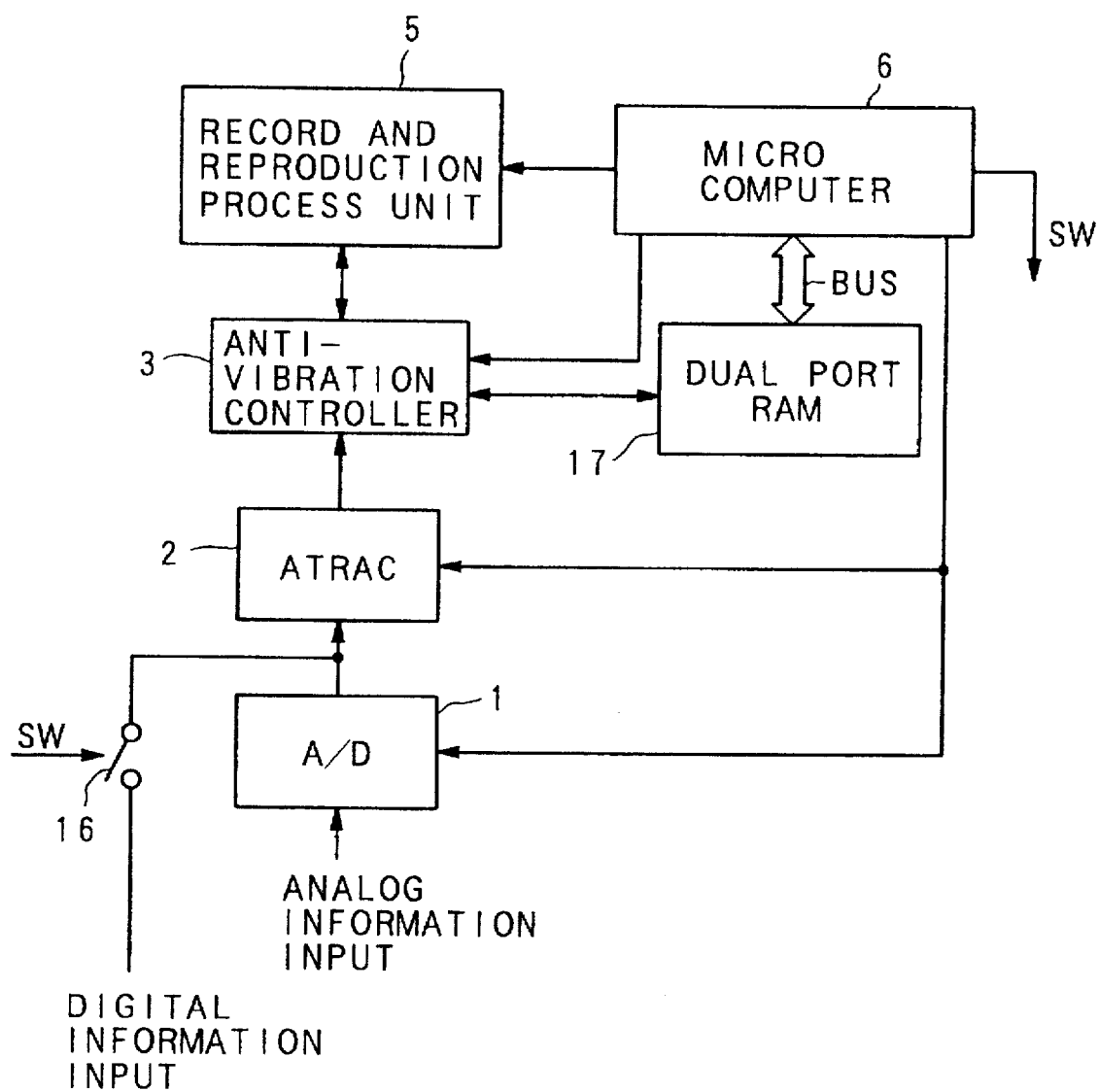
FIG. 5 is a block diagram of an MD apparatus as a second embodiment of the present invention.

FIG. 5 shows an MD apparatus as a second embodiment of the present invention. In FIG. 5, the same constitutional elements as those in the first embodiment carry the same reference numerals and the explanations thereof are omitted.

In FIG. 5, the construction of the second embodiment is different from that of the first embodiment of FIG. 1 in that the memory for storing compressed information 4 is replace by a dual port RAM (Random Access Memory) 17, and that the micro computer 6 is directly connected to the dual port RAM 17 by an address/data bus BUS without the anti-vibration controller 3 therebetween. Otherwise, the construction of the second embodiment is the same as that of the first embodiment.

As a result, the micro computer 6 can directly access the dual port RAM 17, so that the comparing process and the erasing process of the information stored in the dual port RAM 17 can be performed more speedily as compared with the first embodiment, according to the second embodiment.

Third Embodiment

A third embodiment of the present invention will be explained with referring to FIGS. 6 to 9. An MD apparatus as the third embodiment is constructed such that, in the MD apparatus provided with a single optical pickup, by performing the recording operation and the reproducing operation of the information of the magneto optical disc almost simultaneously, it is possible for the user to confirm the recording condition of the recorded information by listening to the reproduced sound.

Figure 6:
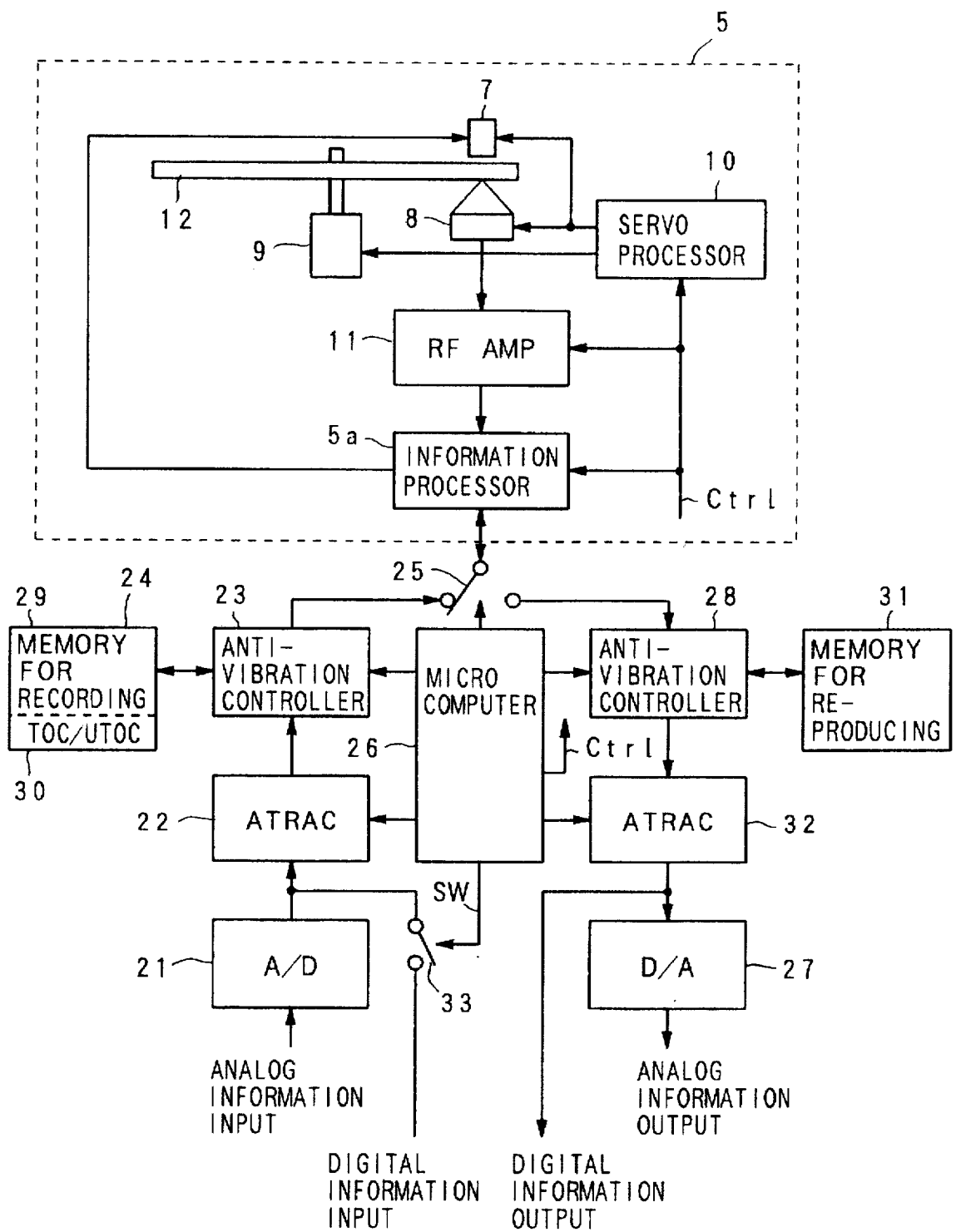
FIG. 6 is a block diagram of an MD apparatus as a third embodiment of the present invention.

FIG. 6 shows a construction of the MD apparatus as the third embodiment. In FIG. 6, the same constitutional elements as those in the first embodiment of FIG. 1 carry the same reference numerals, and the explanations thereof are omitted.

In FIG. 6, the MD apparatus is provided with an A/D convertor 21, an ATRAC device 22, an anti-vibration controller 23, a memory for storing compressed information 24, a record/reproduction switch 25, a micro computer 26, a D/A convertor 27, an anti-vibration controller 28, a memory for reproducing 31, an ATRAC device 32 and an analog/digital information input switch 33.

The A/D convertor 21 converts analog record information inputted from the external of the MD apparatus to digital record information and outputs it to the ATRAC device 22. The D/A convertor 27 converts digital reproduction information, which is reproduced, to analog reproduction information and outputs it to the external. The analog/digital information input switch 33 determines whether the digital information or the analog information is to be inputted at the time of recording, on the basis of the analog/digital information input signal SW, which is outputted by the micro computer 26.

To the ATRAC device 22, the digital information is inputted from the A/D convertor 21 or the external of the MD apparatus at the time of recording. The ATRAC device 22 compresses the data volume of the inputted digital information by the factor of about ⅕ by means of the minimum audible property and the masking effect of the ears of the human being, and outputs the compressed record information to the anti-vibration controller 23. To the ATRAC device 32, the compressed reproduction information is inputted from the anti-vibration controller 28 at the time of reproducing. The ATRAC device 32 expands the compressed reproduction information to be the condition before the compression, and outputs the expanded digital information to the D/A convertor 27 or the external of the MD apparatus.

The memory for storing compressed information 24 has a memory capacity of about 1 Mega Bits, and has a memory for recording 29 and a memory for TOC/UTOC 30.

The memory for recording 29 is a memory for temporarily storing the compressed record information which is inputted from the ATRAC device 22 through the anti-vibration controller 23 at the time of recording. The memory for TOC/UTOC 30 stores a table to manage the information of the magneto optical disc 12. The memory for reproducing 31 is a memory for temporarily storing the compressed reproduction information which is inputted from the record and reproduction process unit 5 through the anti-vibration controller 28 in order to prevent the sound jump etc. due to the vibration at the time of reproduction. C2PO data (i.e. information for error correction) are added to the compressed reproduction information, which is reproduced, in addition to the compressed record information. Thus, it is preferable that the memory for reproducing 31 has the memory capacity of about 1.5 times as large as that of the memory for recording 29.

To the anti-vibration controller 23, the compressed record information is inputted from the ATRAC device 22 at the time of recording. The anti-vibration controller 23 reads out the compressed record information from the memory for recording 29 in the order of storing it to the memory for recording 29, and outputs it to the record and reproduction process unit 5 when the data volume of the compressed record information stored in the memory for recording 29 exceeds the data volume of the record unit. To the anti-vibration controller 28, the compressed reproduction information is inputted from the record and reproduction process unit 5 at the time of reproducing. The anti-vibration controller 28 temporarily stores the compressed reproduction information to the memory for reproducing 31, and reads out it from the memory for reproducing 31 in the order of storing it to the memory for reproducing 31 and outputting it to the ATRAC device 32.

The record/reproduction switch 25 switches to output the compressed record information from the anti-vibration controller 23 to the record and reproduction process unit 5 (i.e. perform the recording process) or to output the compressed reproduction information from the record and reproduction process unit 5 to the anti-vibration controller 28 (i.e. perform the reproducing process) on the basis of the command of the micro computer 26.

To the record and reproduction process unit 5, the compressed record information is inputted from the memory for recording 29 at the time of recording. The record and reproduction process unit 5 modulates it by the information processor 5a, and records it onto the magneto optical disc 12 by the magnetic head 7 and the optical pickup 8 at the time of recording. At the time of reproducing, the record and reproduction process unit 5 reads the compressed record information recorded on the magneto optical disc 12 by the optical pickup 8 as the compressed reproduction information, amplifies it by the RF amplifier 11, demodulates it by the information processor 5a, and outputs it to the memory for reproducing 31.

The magneto optical disc 12 is constructed as a magneto optical disc of re-writable type by means of the magnetic layer.

The servo processor 10 is controller by a control signal Ctrl generated by the micro computer 26.

Nextly, the operation for recording the information onto the magneto optical disc 12 in the third embodiment will be explained with referring to a flow chart of FIG. 7. At the initial condition, the following processes are performed along with the recording process onto the magneto optical disc 12. Namely, the analog/digital information input switch 33 is switched to the side of the "analog information input" by the analog/digital information input signal SW from the micro computer 6, so that the analog record information is continuously inputted to the A/D convertor 21 from the external of the MD apparatus. The analog record information is converted by the A/D convertor 21 one after another to the digital record information. The digital record information is compressed by the unit of 1 cluster by the ATRAC device 22, and is outputted as the compressed record information to the anti-vibration controller 23. The anti-vibration controller 23 stores the compressed record information to the memory for recording 29. Further, the record/reproduction switch 25 selects the recording side. The compressed reproduction information stored in the memory for reproducing 31 is outputted one after another by the anti-vibration controller 28 to the ATRAC device 32. The compressed reproduction information outputted from the anti-vibration controller 28 is expanded to the condition before the compression by the ATRAC device 32. The digital reproduction information outputted from the ATRAC device 32 is converted to the analog information by the A/D convertor 27, and outputted to the external of the MD apparatus. The outputted analog information is amplified by an amplifier and becomes the reproduction sounds by a loud speaker (which are not shown in the figure). Further, the user, who operates the recording operation of the magneto optical disc 12 at the MD apparatus, listens to the reproduction sound so as to check and confirm the recording condition of the information recorded on the magneto optical disc 12 at the time of recording and he is ready to stop the recording process at any time when he realizes that the recording condition is not satisfactory.

Figure 7:
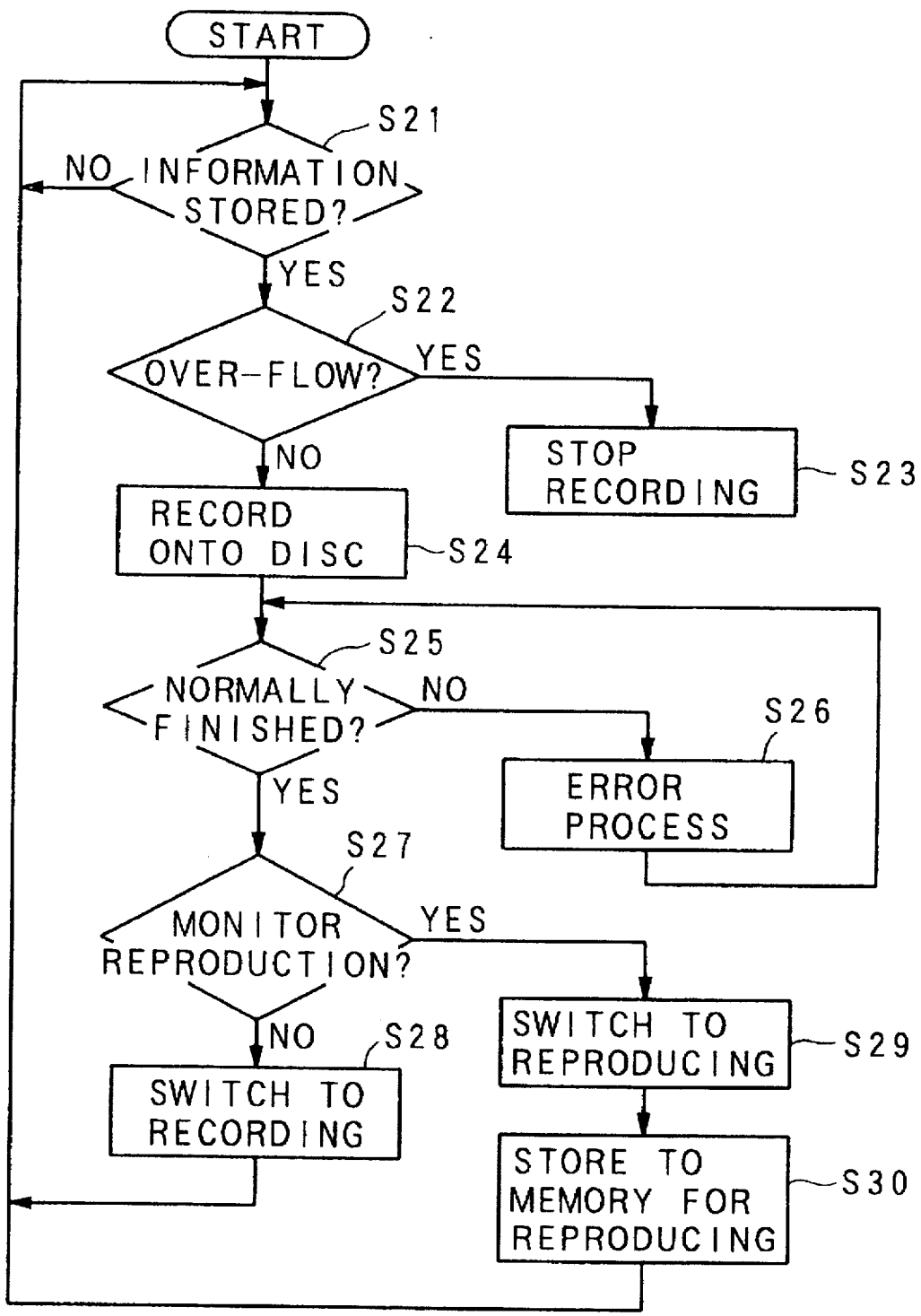
FIG. 7 is a flow chart showing a recording operation of the third embodiment.

In FIG. 7, firstly, the micro computer 26 judges whether or not the compressed record information is stored in the memory for recording 29 by the data volume of not less than the data volume of the record unit (step S21).

As long as it does not reach the data volume of the record unit (step S21: NO), this step is repeated.

When it is judged to reach the data volume of the record unit (step S21: YES), the micro computer 26 judges whether or not the memory for recording 29 is over-flown (step S22).

If it is judged to be over-flown (step S22: YES), the MD apparatus stops the recording operation (step S23).

If it is not judged to be over-flown (step S22: NO), the micro computer 26 records the compressed record information onto the magneto optical disc 12 by the data volume of the record unit, which is stored in the memory for recording 29, in the order of storing it to the memory for recording 29 (step S24). Then, the micro computer 26 judges whether or not recording onto the magneto optical disc 12 is normally finished (step S25).

If it is not judged to be normally finished (step S25: NO), the cause of the abnormality is examined, and it is recovered to be the normal condition, so that the compressed record information of the memory for recording 29 is recorded again onto the magneto optical disc 12 as an error process (step S26). More concretely, if the abnormality lies in the servo system, the re-adjustment of the focusing mechanism, the readjustment of the tracking mechanism etc. are performed. If it is the case that writing to a target address is failed twice, this address is registered as the defective sector. Then, another address is specified as a new target address to record it, and the compressed record information is recorded on the magneto optical disc 12 again at the new target address. After that, the flow returns to the step S25, so as to judge whether or not recording onto the magneto optical disc 12 at the new target address is normally finished.

If it is judged to be normally finished (step S25: YES), the micro computer 26 judges whether or not the special reproduction to confirm the recording condition of the compressed record information recorded on the magneto optical disc 12 (i.e. the monitor reproduction) is to be performed with considering the condition of the MD apparatus such as the empty memory area of the memory for recording 29 (step S27).

If the monitor reproduction is not judged to be performed (step S27: NO), the micro computer 26 switches the record/reproduction switch 25 to the "recording" side (step S28), and the flow returns to the step S21.

If the monitor reproduction is judged to be performed (step S27: YES), the micro computer 26 switches the record/reproduction switch 25 to the "reproducing" side (step S29), and the compressed record information, which recording condition is not checked and confirmed yet, out of the compressed record information on the magneto optical disc 12, is reproduced to be stored into the memory for reproducing 31 (step S30). Then, the flow returns to the step S21.

Figure 8A:
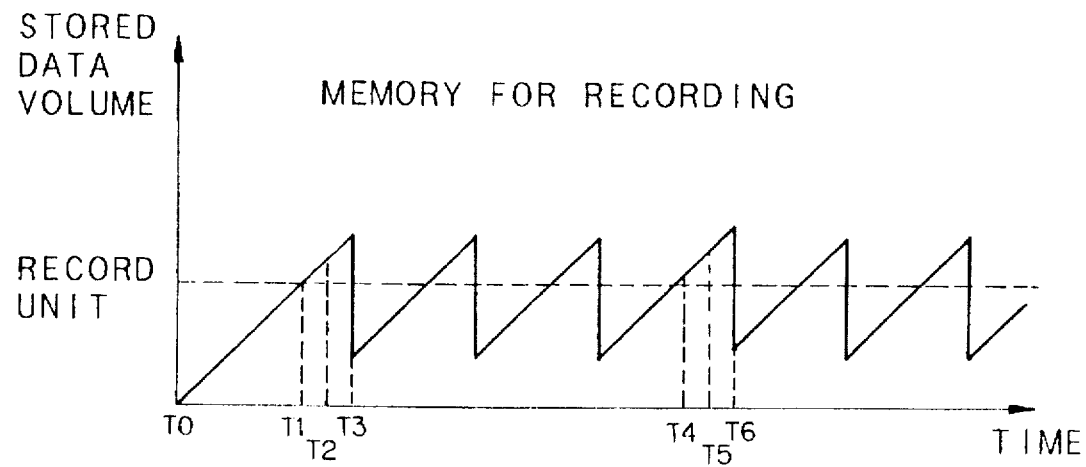
FIG. 8, which consist of FIG. 8A and FIG. 8B, are timing charts of stored data volumes of the memories in the third embodiment.
Figure 8B:
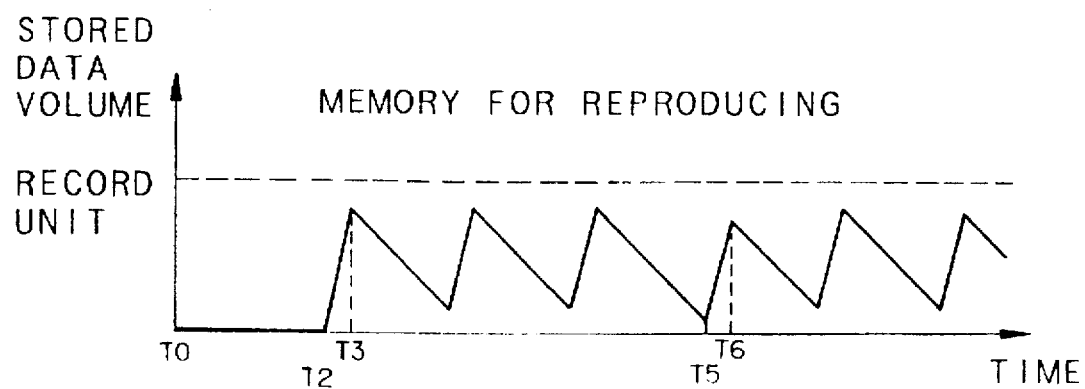

Nextly, the relationship between the stored data volumes of the memory for recording 29 and the memory for reproducing 31 and the elapsed time in the third embodiment will be explained with referring to the timing charts of FIG. 8. FIG. 8A shows the case of the memory for recording 29, while FIG. 8B shows the case of the memory for reproducing 31. In FIG. 8, the x axis represents the elapsed time, while the y axis represents the stored data volume of the compressed information stored in each memory. The y axis is provided with a boundary line which corresponds to the data volume of the record unit which is the unit of writing the compressed information of the memory for recording 29 onto the magneto optical disc 12 in the MD apparatus.

In FIGS. 8A and 8B, at the time "T0" i.e. at the initial condition, it is assumed that the compressed information is not stored in the memory for recording 29 or the memory for reproducing 31, and that the record/reproduction switch 25 is switched to the "recording" side.

After the time "T0", the continuous compressed information is kept to be inputted at a constant rate to the memory for recording 29.

At the time "T1", when the data volume of the compressed record information stored in the memory for recording 29 reaches the data volume of the record unit, the MD apparatus starts recording the compressed record information by the data volume of the record unit onto the magneto optical disc 12.

If recording onto the magneto optical disc 12 is normally finished and the record and reproduction process unit 5 is in the record process stop duration, the record/reproduction switch 25 is switched to the "reproducing" side, so that the compressed record information in the data volume of the record unit, which recording condition is not checked and confirmed yet, is reproduced from the magneto optical disc 12 in the order of recording, and starts storing it as the compressed reproduction information to the memory for reproducing 31 by use of this record stop duration (at the time "T2").

When storing the compressed reproduction information in the data volume of the record unit into the memory for reproducing 31 is completed, at the time "T3", the micro computer 26 erases the compressed record information in the memory for recording 29 corresponding to this compressed reproduction information stored in the memory for reproducing 31, and the record/reproduction switch 25 is switched to the recording side. The anti-vibration controller 28 outputs the compressed reproduction information recorded in the memory for reproducing 31 successively to the ATRAC device 32. The micro computer 26 successively erases the compressed reproduction information in the memory for reproducing 31 which is outputted to the ATRAC device 32. At this time "T3", the reason why the compressed reproduction information stored in the memory for reproducing 31 does not reach the data volume of the record unit, is that the compressed reproduction information is simultaneously stored to the memory for reproducing 31 and outputted to the ATRAC device 32.

In the same manner after that, the MD apparatus repeats recording the input information while reproducing the compressed information recorded on the magneto optical disc 12 to check and confirm the recording condition thereof.

Here, the case is explained where a failure in recording happens in the middle of recording the compressed record information stored in the memory for recording 29 onto the magneto optical disc 12.

When the failure in recording happens (at the time "T4"), the micro computer 26 examines the cause of the failure, to recover it to be the normal condition. More concretely, the MD apparatus judges whether the cause of failure is the abnormality in the servo system or the abnormality in the record address of the magneto optical disc 12. For example, if the abnormality lies in the servo system, the re-adjustment in the focusing mechanism or the re-adjustment in the tracking mechanism is performed. If the cause of the failure lies in writing the information at the writing address of the magneto optical disc 12, the information is recorded again at the same address. Then, if recording the information at the same address is failed again, this address is registered as the defective sector, and recording to another sector is performed.

When the countermeasure with respect to the failure in recording onto the magneto optical disc 12 is completed, and all of the compressed record information of the memory for recording 29 in the data volume of the record unit is recorded onto the magneto optical disc 12, at the time "T5", the micro computer 26 switches the record/reproduction switch 25 to the reproducing side. Then, the micro computer 26 starts storing the compressed record information in the data volume of the record unit recorded on the magneto optical disc 12 as the compressed reproduction information to the memory for reproducing 31.

When the compressed reproduction information in the data volume of the record unit is completely stored to the memory for reproducing 31, at the time "T6", the micro computer 26 erases the compressed record information in the memory for recording 29 corresponding to the compressed reproduction information stored in the memory for reproducing 31.

In the same manner after that, the MD apparatus repeats recording the input information while reproducing the recording condition of the compressed record information recorded on the magneto optical disc 12.

Figure 9A:
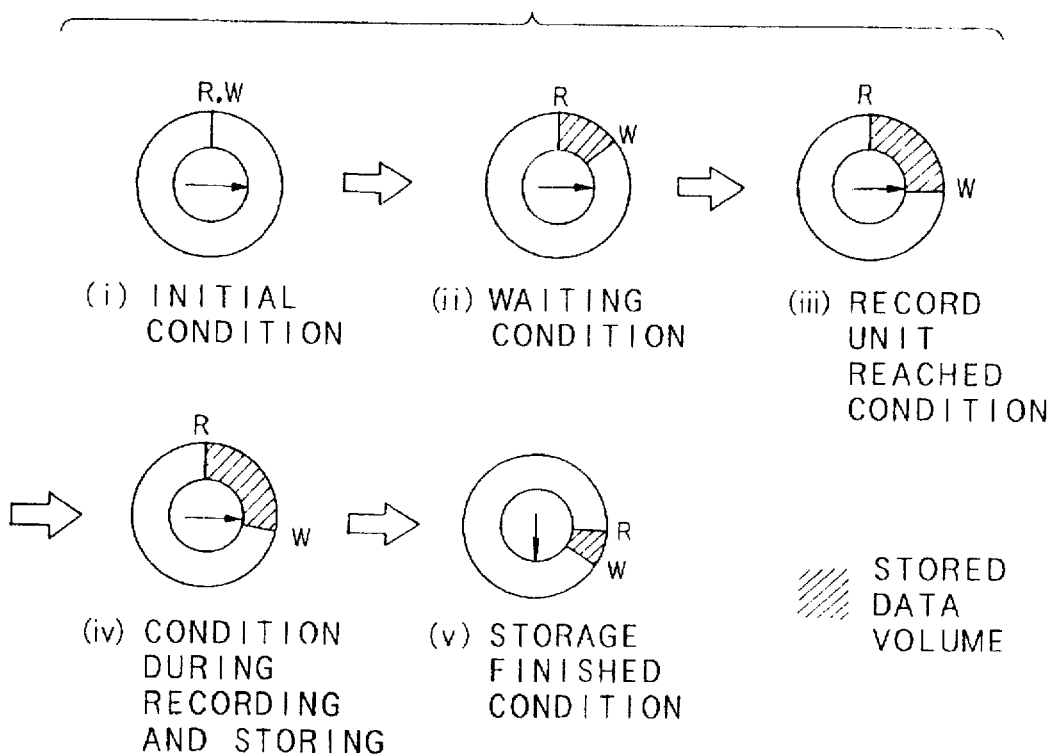
FIG. 9, which consist of FIG. 9A and 9B, are diagrams showing used memory areas of the memories in the third embodiment.
Figure 9B:
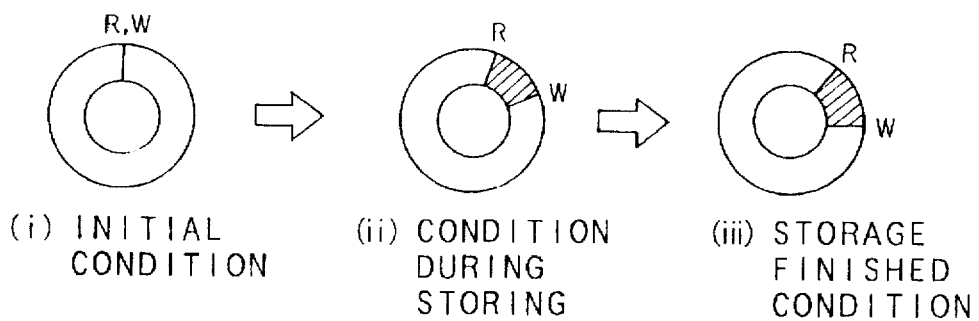

Nextly, the used memory area in the memory for recording 29 and the memory for reproducing 31 at the time of recording in the third embodiment, will be explained with referring to FIG. 9. Here, FIG. 9A shows the used memory area of the memory for recording 29, while FIG. 9B shows the used memory area of the memory for reproducing 31. In FIG. 9, a reference mark "→" represents a record unit pointer, "R" represents a reading pointer, "W" represents a writing pointer, and a shaded area in a ring indicates the data volume of the information stored in each of the memory for recording 29 and the memory for reproducing 31. Here, it is assumed that the compressed record information inputted from the ATRAC device 22 is stored in the right hand direction in each ring of FIG. 9, and that the information is continuously inputted at a constant rate into the memory for recording 29.

In FIG. 9A, at the initial condition, since the compressed record information is not inputted in the memory for recording 29, the shaded area indicating the stored data volume does not exists in the figure and the reading pointer R and the writing pointer W are located at the same position (condition (i) in FIG. 9A).

On the other hand, in FIG. 9B, at the initial condition, since the compressed reproduction information is not inputted in the memory for reproducing 31, the shaded area indicating the stored data volume does not exists in the figure, and the reading pointer R and the writing pointer W are located at the same position in the same manner as the memory for recording 29 (condition (i) in FIG. 9B).

Then, in the waiting condition until the data volume of the compressed record information stored in the memory for recording 29 reaches the data volume of the record unit, the new compressed record information is continuously stored into the memory for recording 29 at the position indicated by the writing pointer W. The shaded area between the reading pointer R and the writing pointer W, which indicates the data volume of the compressed record information stored in the memory for recording 29, increases. At this stage, the writing pointer W does not reach the position corresponding to the record unit pointer "→" yet.

Then, at the moment when the data volume of the compressed record information stored in the memory for recording 29 reaches the data volume of the record unit, the writing pointer W and the record unit pointer "→" are located at the same position (the condition (iii) in FIG. 9A).

Then, while the compressed record information recorded on the magneto optical disc 12 is stored into the memory for reproducing 31 after the compressed record information stored in the memory for recording 29 is recorded onto the magneto optical disc 12, the compressed record information is still continuously stored into the memory for recording 29 through the anti-vibration controller 23 from the ATRAC device 22 (condition (iv) in FIG. 9A).

Then, while the compressed record information recorded on the magneto optical disc 12 is being stored into the memory for reproducing 31, the position of the writing pointer W is increasing and the position of the reading pointer R is also gradually increasing. Namely, the compressed reproduction information is being stored into the memory for reproducing 31 from the magneto optical disc 12 while the compressed reproduction information stored in the memory for reproducing 31 is successively being outputted to the ATRAC device 32 (condition (ii) in FIG. 9B).

When, it is finished to store the compressed reproduction information in the data volume of the record unit recorded on the magneto optical disc 12 to the memory for reproducing 31, the position of the record unit pointer "→" is moved (rotated) in the right hand direction by the amount corresponding to the data volume of the record unit, and the position of the reading pointer R is moved (rotated) to the position of the previous record unit pointer "→" so that the new compressed record information can be recorded to the memory for recording 29 (condition (v) in FIG. 9A). After that, the waiting condition shown in the condition (ii) in FIG. 9A is continued until the position of the writing pointer W reaches the position of the record unit pointer "→".

On the other hand, when it is finished to store the compressed record information recorded on the magneto optical disc 12 into the memory for reproducing 31, the reading pointer R is gradually increasing in the same manner as the condition (ii) in FIG. 9B while the position of the writing pointer W is stopped at the position corresponding to the data volume of the record unit. Thus, the shaded area corresponds to the compressed reproduction information which is not outputted to the ATRAC device 32 yet (condition (iii) in FIG. 9B).

As described above, according to the construction of the present embodiment, the micro computer 6 reproduces the compressed record information recorded on the magneto optical disc 12 and stores it to the memory for reproducing 31 while the optical pickup 8 is in the record stop duration. Thus, the compressed reproduction information stored in the memory for reproducing 31 is successively outputted to the external of the MD apparatus. As a result, the MD apparatus by use of a single optical pickup 8 can reproduce the compressed record information recorded on the magneto optical disc 12 so as to check and confirm the recording condition thereof by listening to the reproduced audio sound during the recording process of the compressed record information.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for recording record information, which is continuously inputted from the external, onto a record medium, said apparatus comprising:

a compressing means for compressing the record information;

a first memory for temporarily storing the compressed record information;

an optical pickup for writing and reading the compressed record information onto and from the record medium;

a control means for controlling said optical pickup to periodically write the compressed record information from the first memory by a predetermined data volume onto the record medium, to stop writing in a record stop duration which is a duration while a writing operation by said optical pickup is temporarily stopped in a middle of a recording operation of the record medium, and to read the compressed record information from the record medium as compressed reproduction information in the record stop duration;

a second memory for storing the compressed reproduction information; and a judgment means for judging whether or not the compressed reproduction information stored in said second memory is coincident with the compressed record information stored in said first memory.

2. An apparatus according to claim 1, further comprising an expansion means for expanding the compressed reproduction information to be identical with the record information before compressed by said compressing means.

3. An apparatus according to claim 1, further comprising an erasing means for erasing the compressed reproduction information in said second memory and the compressed record information in said first memory if the compressed reproduction information in said second memory is judged to be coincident with the compressed record information in said first memory.

4. An apparatus according to claim 1, wherein said control means controls said optical pickup to write the compressed record information, with which the compressed reproduction information is not judged to be coincident, onto the record medium at a same address again.

5. An apparatus according to claim 1, wherein said control means controls said optical pickup to write the compressed record information, with which the compressed reproduction information is not judged to be coincident, onto the record medium at a different address again.

6. An apparatus according to claim 1, wherein said first memory and said second memory comprise a dual port RAM connected with said control means through a communication bus.

7. An apparatus according to claim 1, wherein:

the record information is inputted from the external through either one of a digital terminal for digital record information and an analog terminal for analog record information; and said apparatus further comprises an A/D convertor for converting the analog record information inputted through the analog terminal to the digital record information and outputting the digital record information to said compressing means.

8. An apparatus according to claim 1, further comprising another judgement means for judging whether or not said first memory is over-flown before the compressed record information of the predetermined data volume is stored in said first memory, said control means controlling said optical pickup to stop recording if said first memory is judged to be over-flown.

9. An apparatus for recording record information, which is continuously inputted from the external, onto a record medium, said apparatus comprising:

a compressing means for compressing the record information;

a first memory for temporarily storing the compressed record information;

an optical pickup for writing and reading the compressed record information onto and from the record medium;

a control means for controlling said optical pickup to periodically write the compressed record information from the first memory by a predetermined data volume onto the record medium, to stop writing in a record stop duration which is a duration while a writing operation by said optical pickup is temporarily stopped in a middle of a recording operation of the record medium, and to read the compressed record information from the record medium as compressed reproduction information in the record stop duration;

a second memory for storing the compressed reproduction information; and an expansion means for expanding the compressed reproduction information from the second memory to be identical with the record information before compressed by said compressing step.

10. An apparatus according to claim 9, further comprising a switching means for switching a first information route, which is from said first memory to said optical pickup, and a second information route, which is from said optical pickup to said second memory, from one to another.

11. An apparatus for recording record information, which is continuously inputted from the external, onto a record medium and reproducing the record information from the record medium, said apparatus comprising:

a compressing means for compressing the record information;

a first memory for temporarily storing the compressed record information;

an optical pickup for writing and reading the compressed record information into and from the record medium;

a control means for controlling said optical pickup to periodically write the compressed record information from the first memory by a predetermined data volume onto the record medium, to stop writing in a record stop duration which is a duration while a writing operation by said optical pickup is temporarily stopped in the middle of a recording operation of the record medium, and to read the compressed record information from the record medium as compressed reproduction information in the record stop duration, in a recording operation, and for controlling said optical pickup to read the compressed record information from the record medium as the compressed reproduction information in a reproducing operation;

a second memory for storing the compressed reproduction information read from said record medium in the record stop duration in the recording operation;

a judgment means for judging whether or not the compressed reproduction information stored in said second memory is coincident with the compressed record information stored in said first memory in the recording operation; and an expansion means for expanding the compressed reproduction information to be identical with the record information before compressed by said compressing means in the reproducing operation.

12. An apparatus according to claim 11, wherein said expansion means expands the compressed reproduction information from the second memory in the recording operation.

13. An apparatus according to claim 11, further comprising an erasing means for erasing the compressed reproduction information in said second memory and the compressed record information in said first memory if the compressed reproduction information in said second memory is judged to be coincident with the compressed record information in said first memory.

14. An apparatus according to claim 11, wherein said control means controls said optical pickup to write the compressed record information, with which the compressed reproduction information is not judged to be coincident, onto the record medium at a same address again in the recording operation.

15. An apparatus according to claim 11, wherein said control means controls said optical pickup to write the compressed record information, with which the compressed reproduction information is not judged to be coincident, onto the record medium at a different address again in the recording operation.

16. An apparatus according to claim 11, wherein said first memory and said second memory comprise a dual port RAM connected with said control means through a communication bus.

17. An apparatus according to claim 11, wherein:

the record information is inputted from the external through either one of a digital terminal for digital record information and an analog terminal for analog record information; and said apparatus further comprises an A/D convertor for converting the analog record information inputted through the analog terminal to the digital record information and outputting the digital record information to said compressing means.

18. An apparatus according to claim 11, further comprising another judgement means for judging whether or not said first memory is over-flown before the compressed record information of the predetermined data volume is stored in said first memory, said control means controlling said optical pickup to stop recording if said first memory is judged to be over-flown.

19. An apparatus for recording record information, which is continuously inputted from the external, onto a record medium, and reproducing the record information from the record medium, said apparatus comprising:

a compressing means for compressing the record information;

a first memory for temporarily storing the compressed record information;

an optical pickup for writing and reading the compressed record information onto an from the record medium;

a control means for controlling said optical pickup to periodically write the compressed record information from the first memory by a predetermined data volume onto the record medium, to stop writing in a record stop duration which is a duration while a writing operation by said optical pickup is temporarily stopped in the middle of a recording operation of the recording medium, and to read the compressed record information from the record medium as compressed reproduction information in the record stop duration, in a recording operation, and for controlling said optical pickup to read the compressed record information from the record medium as the compressed reproduction information in a reproducing operation;

a second memory for storing the compressed reproduction information read from said record medium in the record stop duration in the recording operation; and an expansion means for expanding the compressed reproduction information from the second memory to be identical with the record information before compressed by said compressing means in the reproducing operation, and for expanding the compressed reproduction information to be identical with the record information before compressed by said compressing means in the reproducing operation.

20. An apparatus according to claim 19, further comprising a switching means for switching a first information route, which is from said first memory to said optical pickup, and a second information route, which is from said optical pickup to said second memory, from one to another.

21. A method of recording record information onto a record medium by use of an optical pickup, comprising the steps of:

continuously inputting the record information;

compressing the inputted record information;

temporarily storing the compressed record information into a first memory;

controlling said optical pickup to periodically write the compressed record information from the first memory by a predetermined data volume onto the record medium, to stop writing in a record stop duration which is a duration while a writing operation by said optical pickup is temporarily stopped in the middle of said record medium, and to read the compressed record information from the record medium as compressed reproduction information in the record stop duration;

storing the compressed reproduction information into a second memory; and judging whether or not the compressed reproduction information stored in said second memory is coincident with the compressed record information stored in said first memory.

22. A method of recording record information onto a record medium by use of an optical pickup, comprising the steps of:

continuously inputting the record information;

compressing the inputted record information;

temporarily storing the compressed record information into a first memory;

controlling said optical pickup to periodically write the compressed record information from the first memory by a predetermined data volume onto the record medium, to stop writing in a record stop duration which is a duration while a writing operation by said optical pickup is temporarily stopped in the middle of a recording operation of the record medium, and to read the compressed record information from the record medium as compressed reproduction information in the record stop duration;

storing the compressed reproduction information into a second memory; and expanding the compressed reproduction information from the second memory to be identical with the record information before compressed by said compressing step.

* * * * *